United States Patent [19]
Minks

[11] Patent Number: 5,859,525
[45] Date of Patent: Jan. 12, 1999

[54] ALTERNATOR RECTIFICATION, REGULATION, AND CONTROL CIRCUIT

[75] Inventor: Floyd M. Minks, Kissimmee, Fla.

[73] Assignee: Minks Engineering, Inc., Kissimmee, Fla.

[21] Appl. No.: 837,566

[22] Filed: Apr. 21, 1997

Related U.S. Application Data

[63] Continuation of Ser. No. 222,648, Apr. 1, 1994, abandoned, which is a continuation-in-part of Ser. No. 126,543, Sep. 24, 1993, abandoned.

[51] Int. Cl.[6] ................................................ H02P 9/16
[52] U.S. Cl. ......................................... 322/94; 322/89
[58] Field of Search ............................. 322/10, 46, 89, 322/90, 94

[56] References Cited

U.S. PATENT DOCUMENTS

| | | | |
|---|---|---|---|
| 3,400,318 | 9/1968 | Hill | 320/41 |
| 3,508,138 | 4/1970 | Schatz | 322/90 |
| 4,029,456 | 6/1977 | Sato et al. | 322/29 |
| 4,195,256 | 3/1980 | Carmichael | 322/90 |
| 4,456,870 | 6/1984 | Rodari | 322/29 |
| 4,459,536 | 7/1984 | Wirtz | 322/10 |
| 4,791,349 | 12/1988 | Minks | 323/266 |
| 5,399,958 | 3/1995 | Iyoda | 323/282 |
| 5,642,033 | 6/1997 | Bartol et al. | 322/25 |

Primary Examiner—Nestor Ramirez
Assistant Examiner—Nicholas Ponomarenko
Attorney, Agent, or Firm—Allen, Dyer, Doppelt, Milbrath & Gilchrist, P.A.

[57] ABSTRACT

A system for rectifying and regulating the flow of electrical power from a multi-winding alternator to a load such as a vehicle battery automatically changes the effective connection of the alternator windings to obtain maximum output power over a wide speed range of the alternator. When applied to an alternator of the type commonly used on vehicles such as snowmobiles, this system can approximately double the output current at maximum engine speed without reducing the output at minimum engine speed.

14 Claims, 5 Drawing Sheets

ALTERNATOR RECTIFICATION, REGULATION, AND CONTROL CIRCUIT

This application is a continuation of application Ser. No. 08/222,648, filed Apr. 1, 1994, now abandoned, which itself is a continuation-in-part of application Ser. No. 08/126,543, filed Sep. 24, 1993, now abandoned, each for an Alternator Rectification, Regulation, and Control Circuit, all commonly owned with the instant application.

BACKGROUND OF THE INVENTION

This invention relates to an electronic switching system for electrical loads associated with small engine-driven vehicles. This system automatically controls the flow of power from one or more alternator windings to a battery and other electrical loads.

FIELD OF THE INVENTION

The electrical systems commonly used on recreational vehicles, such as snowmobiles, all-terrain vehicles, small personal watercraft and outboard motors typically contains and engine-driven alternator usually of a permanent magnet type. This alternator supplies power to the vehicle's electrical system which may consist of a battery, used for starting or other loads, and a lighting system. The output voltage and frequency of these alternators vary with engine speed, and the output wave form is typically non-sinusoidal. The output phase of these alternators typically varies greatly with load. The lighting system may be run either directly from the alternating current output of the alternator or from the battery. In watercraft, fuel pumps and bilge pumps are commonly part of the electrical load. A manual switch is sometimes used to turn off and on lights partially when the lights are run from the battery. Safety considerations, and in some cases government regulations, may prescribe that lights on recreational vehicles be on all the time that the engine is operating. The batteries on these vehicles are relatively small and the alternator outputs are frequently insufficient to supply the full brilliance of the lights at engine idle. Therefore, batteries are frequently run down either by operation with extended periods at idle or by the light not being turned off promptly when the engine is stopped.

SUMMARY OF THE INVENTION

It is a first object of this invention to provide an automated system for controlling lights or other loads. This system is responsive to the operation of the engine and to the battery voltage, and automatically reduces the power to the lights to the power available from the alternator when the battery is below a given voltage.

The permanent magnet alternators commonly used on vehicles of the type described above may be wound with a relatively large number of turns to optimize output at low engine speed or a relative small number of turns to optimize output at high engine speed. A switching method is incorporated in the present invention to effectively change the number of alternator turns at a selected intermediate speed. Thus it is a second object of this invention to increase the output of a given physical size and weight permanent magnet alternator at high engine speed without reducing that output from that previously existed at a low engine speed.

It should be understood that the portions of this invention that are primarily operable to accomplish the above first and second object of this invention must function without interference with each other and desirably have components in common to reduce the size and cost of the system of this invention. The simultaneous accomplishment of the previously mentioned first and second objects is therefore also an object of this invention; however the first and second objects may also be achieved alone. It is a further object of this invention to utilize the alternator power to operate loads and charge the battery as required without manual switching by the vehicle operator, and to increase the power available from a given size alternator over a portion of the speed range of said alternator without decreasing the power available over the remaining portion of the speed range.

DESCRIPTION OF THE DRAWINGS

The above and other objects, and features of the invention will become apparent from the following detailed description taken in conjunction with the accompanying drawings which show a portion of a vehicle electrical system and the components specific to this invention connected therein. Portions of the circuits in the figures are adapted from the circuits in U.S. Pat. Nos. 4,791,349, and 5,018,493 and 5,459,357. These three disclosures are incorporated by reference, and knowledge of these circuits and the terminology used therein is assumed. Therefore, a complete description of obviously similar circuit portions will not be repeated in detail in this disclosure.

TABLE 1

| Schematic Nomenclature For FIGS. 1–3 and 5 | |
| --- | --- |
| SECTION A & F | Alternator and Voltage Sensitive Rectification Circuit Portion |
| SECTION B | Frequency Sensitive Rectification and Frequency Sensitive Circuit Portion |
| SECTION C | Battery Voltage Sensitive Load Control Circuit Portion |
| SECTION D | Voltage Control Amplification Circuit Portion |
| SECTION E | Voltage Reference and Voltage Divider Circuit Portion |

Figure 1:
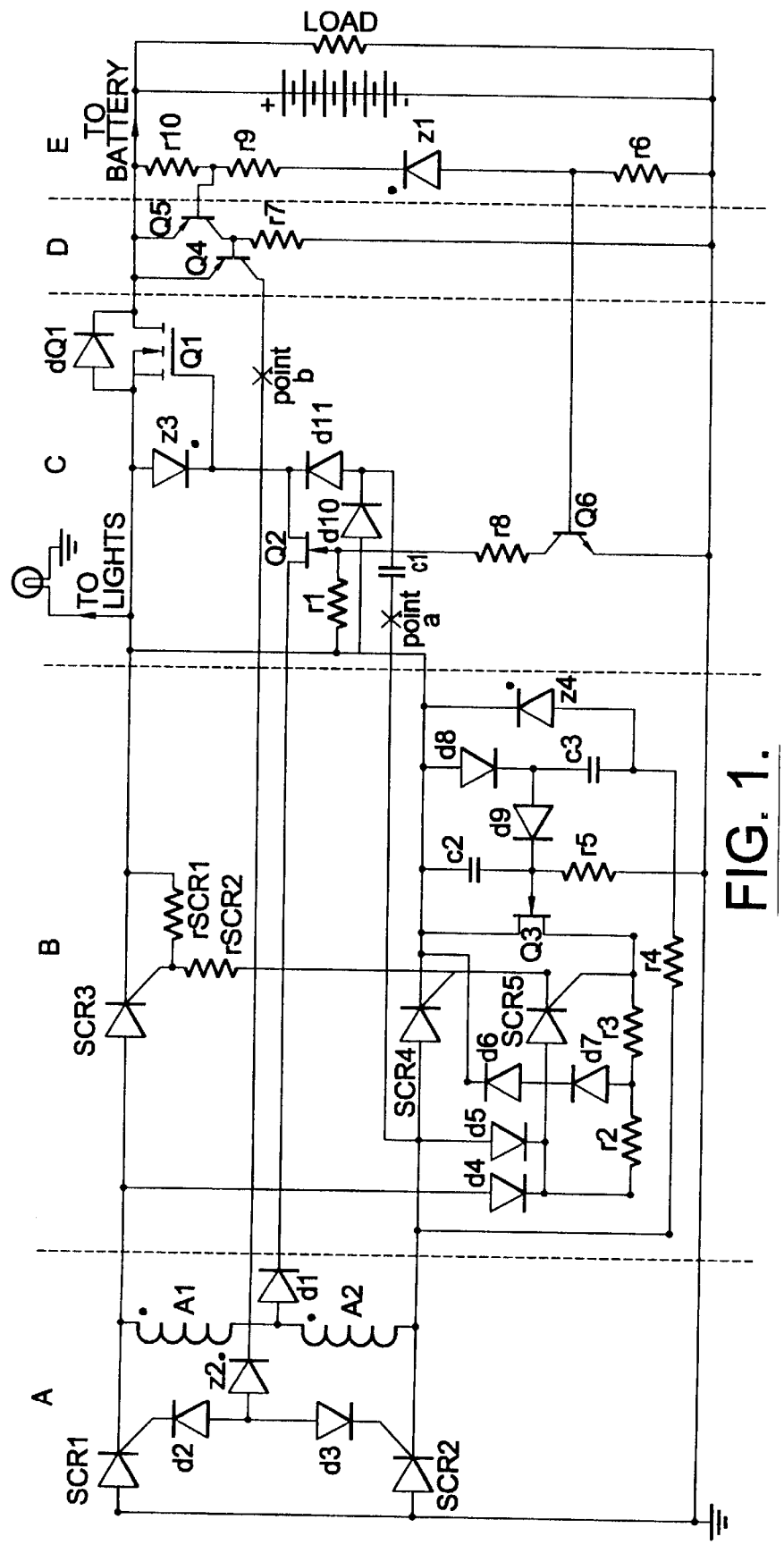
FIG. 1 shows a circuit diagram of a basic version of this invention. The diagram shows the electronic components of the circuit of the invention and also shows the alternator labeled as windings A1 and A2 and connection points to the lights and battery positive and negative which are part of a typical snowmobile or other recreational vehicle electrical system. The alternator would typically be of the permanent magnet type. The diagram is split for the purposes of description into sections separated by dotted lines. These sections are labeled A,B,C,D and E.
Figure 2:
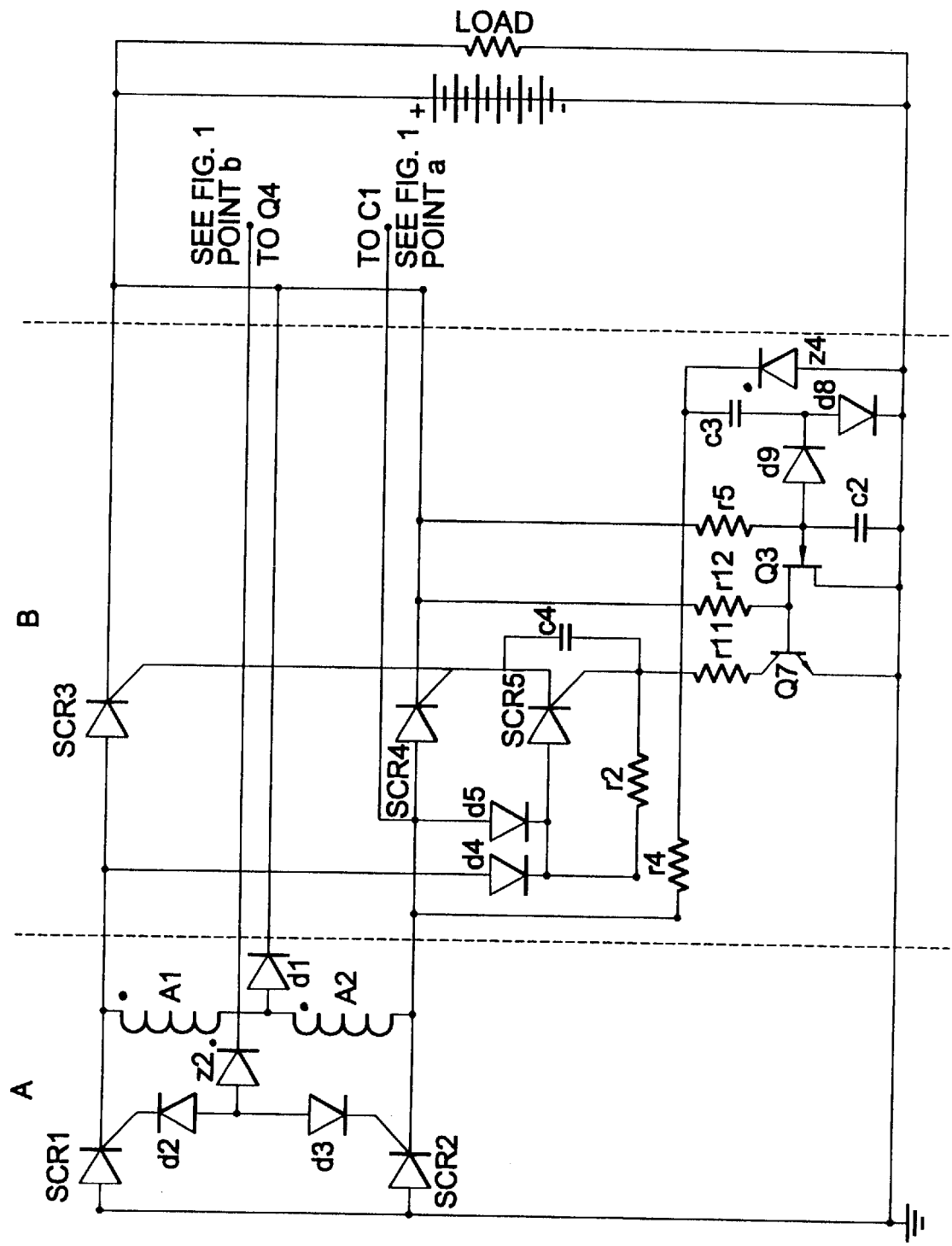
Figure 3:
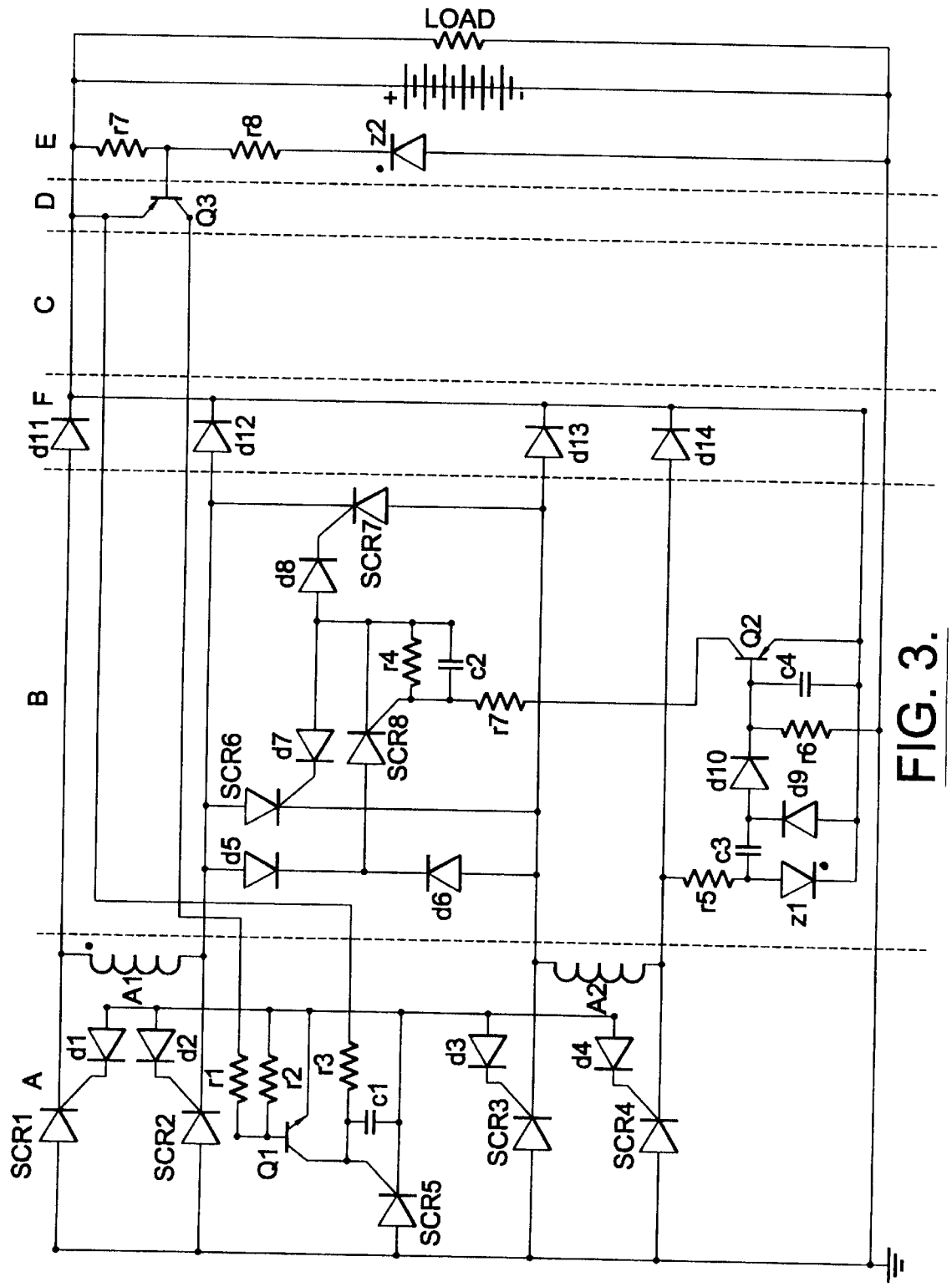

FIG. 2 shows another version of this invention in which some components in section B are changed to produce characteristics that are desirable for certain applications. Connections to the remaining portions of FIG. 1 are also indicated. Components with the same functions as those in FIG. 1 are labeled with the same numbers in FIG. 2. FIG. 3 shows another version of this invention with the changes primarily in section A, and B, and a section F added. The components in section F perform the same functions as will later be described in detail as those in the other figures in section A and are separated in the drawing only to minimize the complexity of the figure. The version of FIG. 3 is particularly useful, as will be described later in detail, where high current outputs are necessary and/or where the heat dissipation capability of the alternator windings are not compatible with the center tap configuration shown for the alternator winding in FIGS. 1 and 2. In FIG. 3 component designations do not necessarily correspond to similar functions in FIGS. 1 and 2. Also in FIG. 3 the functions of sections C are not shown. In applications where they are required the same components and the same configuration as shown in FIG. 1 could be easily added. In all three figures sections A, and sections F if present, include the alternator or connection points for the alternator windings, the primary rectification components to convert the alternating current from the alternator to direct current for supplying the load or charging the battery, together with the gate drive components for the silicon control rectifiers shown as the rectification and regulation element in these sections. The anode and cathode of SCR's, as these devices are normally used, are the load current terminals and the gate terminal is the control terminal. Other solid state devices with load current terminals and one or more control terminal could be substituted by one skilled in the art within the scope of this invention. These components are operable over the entire speed range of the engine driving the alternator and therefore the entire frequency range of the alternator. Section B contains rectification elements, and drive circuitry for these elements, to make them operable only over a selected portion of the frequency range of the alternator. Normally these components would be operable below a selected engine speed, and therefore frequency, to effectively connect the alternator windings in series below that selected frequency and in parallel above that selected frequency. Section C contains components to allow the flow of power from the alternator to the battery but to allow the flow of power from the battery back to the load shown as lamps, only when the battery voltage is above a selected level and the engine and therefore the alternator is operating. Below that level the load shown as lamps would be energized by the available power from the alternator. Section D contains amplification means to allow conduction through the components in section A when the output or battery voltage is below a selected level and prevent that conduction when the voltage is above the selected level. Section E contains the voltage reference and voltage dividers necessary to supply voltage input signals to the sections previously described as C and D.

Figure 4:
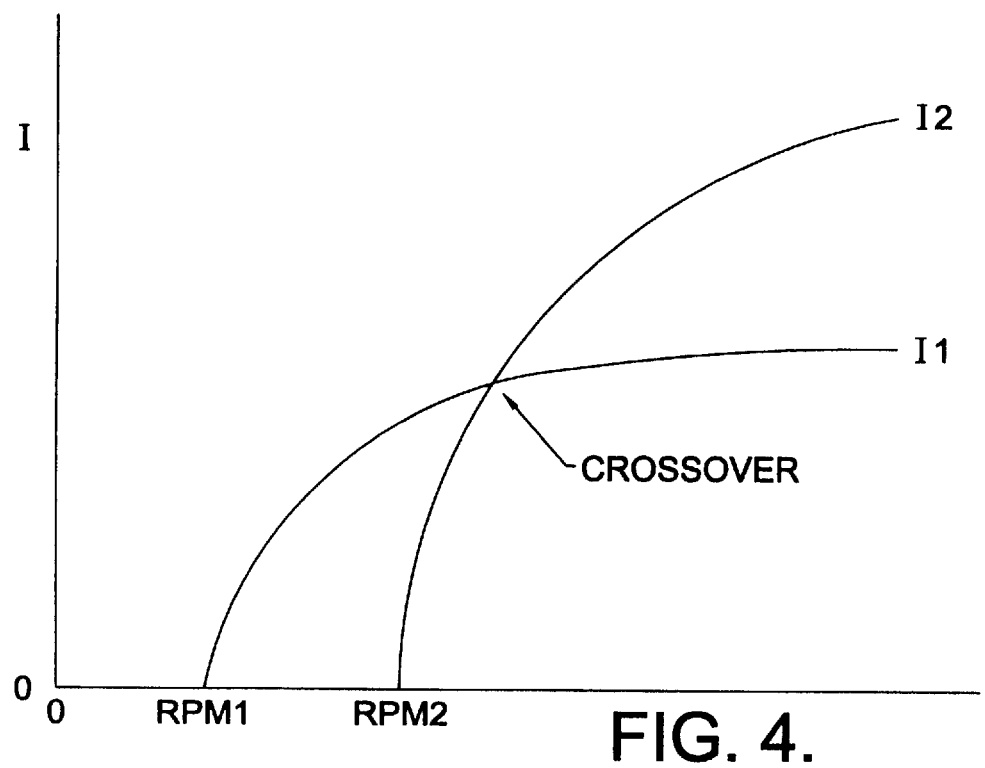

FIG. 4 is a graph of alternator output current variation with alternator RPM.

Figure 5:
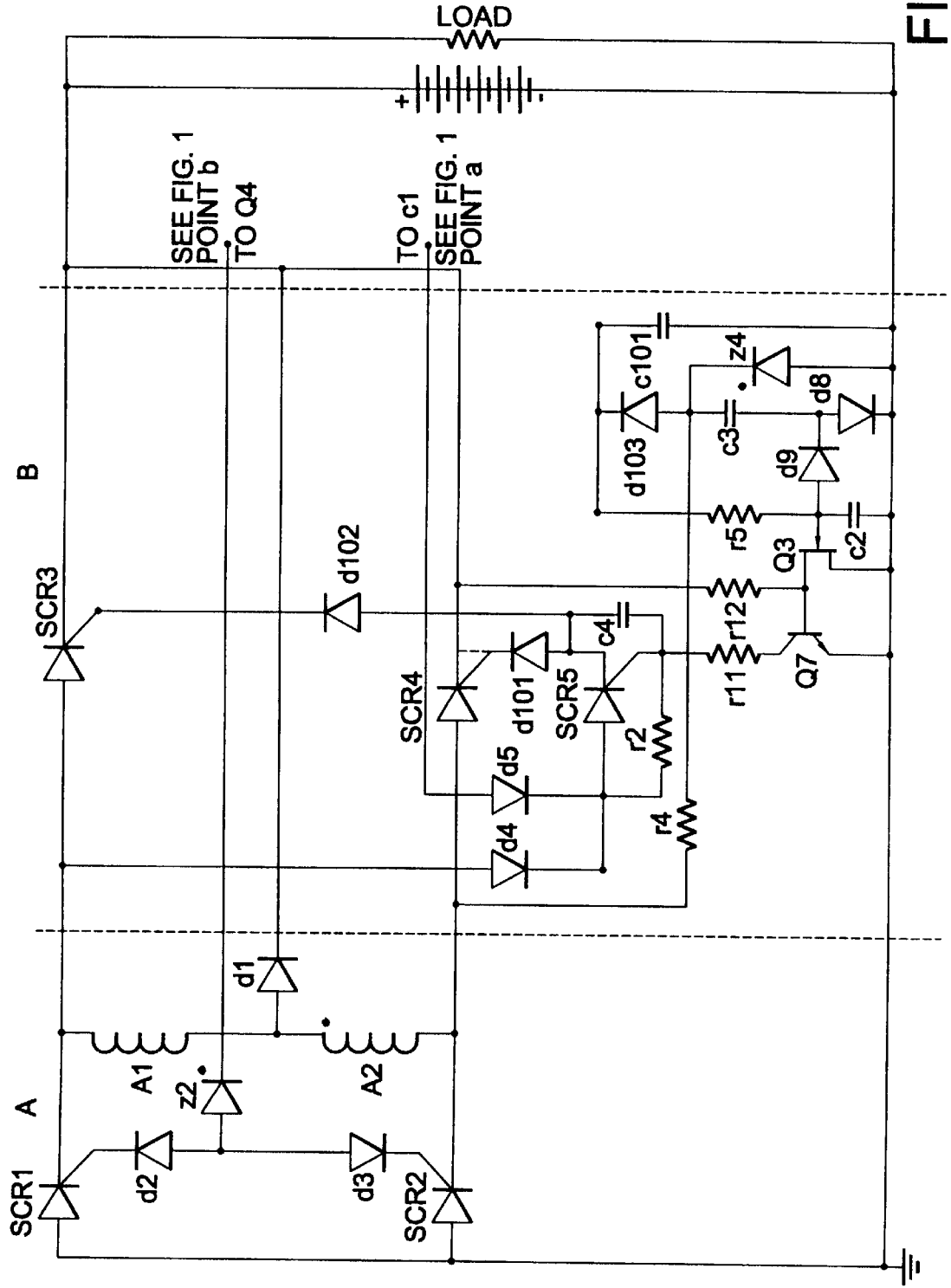

FIG. 5 is the same as FIG. 2 except for the addition of components d101, d102, d103 and C101. In FIG. 5, Z4 would normally be of a voltage below the output regulation voltage. A convenient value would be the same as Z1. Capacitor C101 would thus be charged through diode d103 to a voltage controlled by Z4. The voltage from capacitor C101, which acts as a filter, supplies the current to the gate of Q3 through resistor r5. In the circuit of FIG. 2, internal impedance of the battery and the impedance of the leads connecting this system to the battery can under some conditions produce peak voltages significantly above the average battery voltage. Since the frequency to current circuit containing C3, d8 and d9 is peak responding, the cross over frequency of this circuit shifts with battery impedance. In applications where the magnitude of this shift is detrimental, d103 and C101 will effectively eliminate the shift. This portion of the circuit functions as does equivalent components in Applicant's previous U.S. Pat. No. 4,774,924, which gives a more detailed description and is incorporated herein by reference.

DETAILED DESCRIPTION OF PREFERRED EMBODIMENT

The invention will now be described in detail with reference to FIG. 1, where Section A shows two output windings of an alternator labeled as A1 and A2. The phasing of these windings is such that the common point is electrically a center tap of the two windings. Electrically the voltage of these two windings would normally be in phase thus they constitute a single phase machine however it should be realized that one skilled in the art could use these to represent a single phase with a multi-phase alternator with the appropriate components as shown in the circuit diagram added for each phase.

Permanent magnet alternators are typically used in vehicles, as previously described. The voltage, waveform, electrical phase compared to the mechanical position of the magnets, and frequency, of these alternators vary with engines speed and/or load. Also typically the output voltage is very non-sinusoidal. Thus many control techniques that have proved suitable when working primarily from fixed frequency or sinusoidal power sources are not suitable for use with these alternators when driven at varying speeds. It is therefore an object of this invention to overcome these restrictions and be suitable for alternator open circuit voltages that in many vehicle applications will be 10 to 1 higher at full engine speed than they are at idle.

SCR1 and SCR2 connect the ends of the alternator windings to ground and selectively allow the flow of current from ground to the end of the alternator winding that is instantaneously negative when an appropriate gate signal is supplied to the SCR. This current would then flow through diode D1 to the lights or battery as will be later described. The gate signal for these SCR's is supplied through zener diode Z2 and either diode D2 or D3 to the SCR gates.

At an instant when, for example, the cathode of SCR1 is negative with respect to ground the cathode of SCR2 would be positive and thus SCR2 would be reversed-biased and could not conduct power to the output. At this instant, any current flowing through Zener diode Z2 to supply gate current to the appropriate SCR to allow the flow of power to the output would flow through diode D2 to the gate of SCR1, since the gate of SCR1 is more negative than the gate of SCR2. Thus, diodes D2 and D3 steer the available gate drive flowing through zener diode Z2 to the gate of the SCR that at that instant is capable of being turned on. Zener diode Z2 would normally be selected to have a avalanche voltage above the voltage of the battery of to which the system is connected. Thus if the engine driving the alternator is stopped and the alternator output voltage is therefore zero, current would be prevented from flowing to the gates of SCR1 or SCR2, producing a undesirable load on the battery which in time could discharge the battery. The voltage of this zener diode is not critical since the open circuit voltage across the alternator is normally much higher than the battery voltage. Thus it is not the purpose of zener diode Z2 to control or regulate the battery charging voltage.

Section E contains a zener diode Z1 and a voltage divider network consisting of resistors R6, R9, and R10. Zener diode Z1 is the voltage reference element for this system. In an aid to understanding and by way of example only, the following values typical for charging a 12 volt storage battery might be appropriate: 11 volts for Z1, 2000 ohms for R6, 3000 ohms for R9, 1000 ohms for R10. The voltage across R10 is used to control the maximum voltage to which the battery may be charged. The voltage across R6 is used to control the minimum voltage of the battery below which current may not flow from the battery to the load shown as lights.

It is an object of this invention to use a single voltage reference and voltage divider for both of these control functions not only to reduce the number of components but also since then a single calibration such as by varying R9 is useful in many applications to calibrate both functions. It will be apparent to one skilled in the art that when the battery voltage is at the level where it is desirable to control the flow of power from the battery to the lights, that is typically 12.5 volts, the voltage across R10 is well below the voltage where significant conduction would occur between the emitter and base of Q5. Thus Q5 has no significant or undesirable loading affect. At the higher voltage, typically 14.5, where it is desirable to limit battery charging by sensing the voltage across R10, the voltage across R6 is limited by the base emitter voltage of Q6 which then appears as a diode.

Thus one skilled in the art knowing the typically positive temperature coefficient of zener diode Z1 and the typically negative temperature coefficient of the base-emitter saturation of transistors Q5 and Q6 (which would be multiplied by the ratio of R6 to, R9 plus R10, for the voltage controlling Q6, and R10 to R9 for the voltage controlling Q5) could choose values for Z1, R6, R9 and R10 to give a desired temperature coefficient for these selected voltages. With reference to the voltage at which Q5 is controlled, the temperature coefficient of the base-emitter voltage of Q6 when saturated must of course be considered along with the temperature coefficient of zener diode Z1. This would tend to produce a negative temperature coefficient of the battery charging voltage which is desirable to minimize overcharging at high temperatures.

Section D contains the amplification means to control the maximum voltage to which the battery is charged. Thus these components sense the voltage across resistor R10 and use this to control the flow of current through zener diode Z2. If the battery voltage is below a selected level for maximum battery charging the voltage across R10 is insufficient to turn on transistor Q5. Thus current through resistor R7 will turn on transistor Q4 allowing current to flow from the battery positive terminal through transistor Q4 and zener diode Z2 to the gates of SCR1 and SCR2 as previously described in section A. The value of resistor R7 is sufficiently high to produce negligible battery loading when the engine is stopped. When the battery reaches the desired or selected maximum charging voltage transistor Q5 begins to conduct. Thus voltage is removed from the base emitter junction of transistor Q4. This turns off transistor Q4 preventing additional or over charging of the battery.

Section C contains components to control the flow of power from the battery to the lights or other loads selected for reduced power operation at low battery voltage. The power control element is transistor Q1 shown as an N channel field effect transistor. As is known, inherent in the construction of transistors of this type is an equivalent of a diode connected as shown as by DQ1. This is not a separate component, but is part of in the transistor. This diode is effectively shunted by a resistance equivalent to the "on" resistance of the transistor when the gate of the transistor is biased positive compared to the source. Thus current can always flow from the alternator and rectification components in sections A and B to the battery through transistor Q1. Transistor Q1 must however be biased on, that is with the gate positive compared to the source, for power to flow from the battery to the load shown as lights. Alternating current power passes through and is limited by the impedance of capacitor C1, and is rectified by diodes D10 and D11 to produce a signal to bias the gate of transistor Q1 positive compared to the source. Zener diode Z3 is used to protect the gate from excessively high voltage. Transistor Q2 shown as a N channel junction field effect transistor, is connected to control this gate voltage. A transistor of this type is normally on and is turned off by negative voltage on the gate compared to the source.

Thus, unless a negative voltage is present on the gate of transistor Q2, no gate voltage will exist between the gate and the source of transistor Q1 to turn transistor Q1 on. Resistor R1 shunts the input of transistor Q2 to prevent slight leakage currents which may be present from undesirable affecting the operation of transistor Q2, Transistor Q6 is effectively connected from the gate of transistor Q2 to ground. Current through Q6 is limited by resistor R8. Thus if transistor Q6 is turned on, transistor Q2 is turned off and transistor Q1 may then conduct current from the drain to the source, allowing power to flow from the battery to the lights. Transistor Q6 will be turned on when sufficient voltage is produced across R6 in response to the battery voltage being above a selected level. This level would be selected to prevent the lights from discharging more than the desired portion of the battery capacity. Since extremely small currents are required to turn off transistor Q2, resistor R8 may be of very high value allowing for only negligible discharge of the battery when the engine is not running.

Section B contains rectification and control components that effectively change the configuration of the windings A1 and A2 of the alternator above and below a selected alternator frequency. This can effectively double the alternator output current at high engine speeds without reducing the alternator output current at low engine speed such as near idle. In many real cases this is the equivalent of doubling the power output capability or size of the alternator. These components function as follows: If SCR3 and SCR4 are turned off (that is, have no gate signal supply) then the systems works as previously described with current flowing through diode D1 and at any given instant either SCR1 or SCR2. Thus the voltage across A1 or A2 must exceed the charging voltage of the battery by the voltage drop in the various diode's and SCR's.

If windings A1 and A2 are bifilar wound, then it would be apparent to one skilled in the art that the output of the alternator will be essentially the same as if these two windings were connected in parallel and rectified by a full wave bridge circuit. If the windings are not bifilar wound, but are wound on separate poles (for instance a 12 pole permanent magnet alternator with A1 wound on 6 poles and A2 the other 6 poles, the output at maximum engine speeds, typical of such vehicles as snowmobiles, will still be approximately that attainable with the windings connected in parallel supplying a bridge rectifier, because of the phase shift in the winding.

Each winding A1 and A2 may conduct for a period much greater than what would be 180 degrees phase angle of the open circuit voltage of those windings. It can be seen by one skilled in the art that the arrangement previously described of diodes D2 and D3 and zener diode Z2 will supply the appropriate signal to the SCR that is not conducting even though the remaining SCR is still conducting because of the phase shift just described, and also will desirably prevent additional gate current flow and therefore heating in components such as Z2 and Q4 after the SCR has turned on. As engine speed and therefore alternator speed is reduced, a point will be reached where the voltage from winding A1 or A2 is not sufficiently high to produce a significant current flow through diode D1 and SCR1 or SCR2 to charge the battery. However, if both windings A1 and A2 are considered in series twice the voltage is available. If under this low engine speed, and therefore low alternator voltage condition, SCR3 and SCR4 are turned on, then SCR1, SCR2, SCR3, and SCR4 act as a full wave bridge with the power being supplied by the series-connected windings A1 and A2. Thus, the minimum speed at which at least some battery charging current is available is reduced by approximately 2 to 1.

At the instant when the top end of winding A1 is positive SCR2 and SCR3 would be conducting to charge the battery. If the battery voltage was instantaneously 14 volt, and ignoring the forward voltage drop in conducting semiconductors, the voltage at the center tap between windings A1 and A2 would be 7 volts. Thus diode D1 would be back-biased by 7 volts and have no adverse affect on the operation of the circuit. The same of course would be true for the opposite half cycle. Thus if SCR3 and SCR4 are on, the alternator windings A1 and A2 function as though they were connected in series. However if SCR3 and SCR4 are off, the alternator windings A1 and A2 function very nearly as though they were in parallel.

It should be realized that in this parallel operating mode, the power dissipation from resistive heating in these windings will be higher than if they were actually in parallel, because at any given instant current is flowing through only one winding except as previously explained because of phase shift. SCR3 is shown with a resistor RSCR1 from it's gate to cathode and a resistor RSCR2 in series with the gate connection. Resistors equivalent of these two positions are inherent, or are intentionally manufactured as part of most high current SCR's. They are shown only on SCR3 of FIG. 1, but are present in all of the SCR's intended for handling load currents in this application. SCR5 is used to control the gate current to turn SCR3 or SCR4 on. Since the cathodes of SCR3 and SCR4 are common, the division of this gate drive will be dependent on the value of RSCR1 and RSCR2 inherent in SCR3 and SCR4.

It should be understood that external resistors could also be used in cases where it is found necessary; if these resistors are of equal value in the two SCR's, SCR5 must carry twice the current required to gate on one SCR. With actual commercial components, the values of these resistors vary widely. Therefore for reliable operation of the circuit without sorting SCR's, the anode current through SCR5 would need to be at least 10 times the required gate current. Typical small, sensitive gate SCR's which might be used for SCR5 are capable of short duration pulsed output in excess of 1 amp and thus fulfill this requirement. Sensitive gate SCR's are advantageous over a amplifying component such as a transistors in this location, because the amplifying component would dissipate high power in the partially turned-on condition which might be present during a portion of the cycle.

Diodes D4 and D5 allow power to flow from the end of the series connected windings A1 and A2 is positive at that instant, to the anode of SCR5. If an appropriate gate signal is present at the gate of SCR5, current may thus flow to the gates of SCR3 and SCR4 turning on whichever of these two devises is forward biased at that instant. A small sensitive gate SCR as described above would be used for SCR5; the gate current needed to fire such devices is typically a few microamperes. Thus, the equivalent of RSCR1 in SCR5 is very high and the equivalent RSCR2 and SCR5 is sufficiently low to produce negligible voltage drop at the gate current to fire. The holding current of these devises would typically produce negligible voltage drop across the equivalent resistances RSCR1 present in SCR3 and SCR4. Thus the voltage required on the gate of SCR5 with the respect to the cathode of SCR3 and SCR4 common point, is typically the forward voltage drop of a silicon diode at the existing temperature; at room temperature this is typically 600 millivolts. (It will of course be understood that all the device numbers and parameters given herein are for purposes of illustration and are in no way restrictive to the invention being described here because other values maybe substituted by one skilled in the art.)

Diodes D6 and D7 limit, by their forward conduction voltage, the voltage at the junction common to resistor R2 and R3. Thus, even though the voltage from the anode to the cathode of SCR5, under conditions when this SCR was not gated on, might vary from on the order of 3 volts to 300 volts, the voltage drop from the junction between R2 and R3 to the cathode of SCR4 is expected to stay between 1 and 2 volts. Thus diodes D6 and D7 along with current limiting resistor R2 regulate the voltage available to produce a gate signal to turn on SCR5 through resistor R3. This is the available gate firing current for SCR5.

Transistor Q3, shown as a N channel junction field effect transistor, is connected from the gate of SCR5 to the cathode of SCR4 and serves as a shunt to bypass this current around the gate of SCR5. This removes gate current from SCR5 and also produces a low impedance connected to the gate of SCR5 during times when it is not desired to turn on SCR5. This prevents leakage current from turning on SCR5. As is known, junction field-effect transistors are normally conductive and are turned off by a negative voltage on the gate. The gate of transistor Q3 is effectively connected to two opposing current sources. The negative source is produced by current limiting resistor R5 together with the voltage at the output labeled to lights, and thus is proportional to output voltage. The positive current source is produced by components R4, C3, Z4, D8, and D9. D8 and D9 rectify the current required to charge capacitor C3 as the voltage across it varies in synchronism with the alternator voltage.

This voltage—if the SCR1, SCR2, and SCR4 are on—is limited to the output voltage of this system plus the forward voltage drop of these rectifying components. Thus, if this voltage is lower than the avalanche voltage of zener diode Z4 the output of this positive current source is proportional to the voltage at the terminal marked to lights, multiplied by the frequency of the alternator. (The forgoing voltage is in reference to ground, as are all other voltages mentioned in this patent which are not specifically referred to other points.) Thus the positive and negative current sources just described are both proportional to the voltage at the point marked to lights. Thus variations in this voltage cancels except for relatively small secondary effects.

Capacitor C2 is used to filter or average these two current sources. If SCR4 is not on, zener diode Z4 conducts in the forward direction and limits the positive voltage across capacitor C3 to approximately the system output voltage. If SCR1 is not on, the avalanche voltage of zener Z4 limits the negative peak voltage across capacitors C3 and minimizes the variation in the output of the previously described positive current source. Z4 typically has an avalanche voltage of approximately 1.5 multiplied by the battery voltage. One skilled in the art will understand that the accuracy of the frequency determined by the point where the positive and negative current sources are equal, is only of concern when the battery voltage is below the regulation level, and thus when SCR1 and SCR2 are always on. At above the regulation voltage level, the frequency is not determined accurately but the battery is fully charged so the frequency is of little consequence.

If a curve is plotted for output current of this regulator versus RPM with gate signal applied to SCR1, SCR2, SCR3, and SCR4 as is shown in FIG. 4 then at some initial RPM—which is designated as RPM1—sufficient voltage will be produced by the alternator to start charging the battery. Thus the battery charging current will be zero below RPM1 and will rise with RPM above RPM1. Current I1 is defined as the current available to charge the battery at a maximum engine speed and is thus the end of the curve. If a second curve is plotted on FIG. 4 with gate signal supplied to only SCR1 and SCR2 but not to SCR3 and SCR4 the output current will be zero up to some new RPM which we will define as RPM2 and rise above that point with increasing RPM to a current output defined as I2 at the maximum engine speed. One skilled in the art will know that RPM2 is approximately twice RPM1 and current I2 is approximately twice current I1. Thus these two curves will cross at some engine speed above RPM2, shown as the "crossover" point in FIG. 4.

The components previously described as controlling the positive and negative current sources are selected in the usual case to turn off transistor Q3 at the cross over point. Thus SCR5 and in turn SCR3 and SCR4 are gated on below the cross over point and gated off above the cross over point. Therefore the effective output current of this system is which ever of the previously described two curves is higher at any given RPM.

FIG. 2 is identical to FIG. 1 except in section B which is also identical to FIG. 1 except for the control components connected to the gate or supplying the gate signal to SCR5. Resistor R2 is capable of supplying and limiting a current to turn on SCR5. This current may be shunted to ground through current limiting resistor R11 and transistor Q7. Transistor Q7 is normally biased on by the current flowing from the output through current limiting resistor R12. This current is shunted to ground by transistor Q3 unless a negative voltage on the gate of transistor Q3 renders it nonconductive. The gate of transistor Q3 is connected to a positive current source controlled by resistor R5 and a negative current source controlled by components D8, D9, C3, Z4 and R4 and averaged by capacitor C2. These components function as previously described with reference to FIG. 1.

The line marked to Q4 goes to Q4 in block D of FIG. 1 which is in turn connected to the components in block E of FIG. 1. This produces a battery charging regulator effectively changing the turns ratio of the alternator by two to one at the "cross over" frequency (FIG. 4).

The components in block C of FIG. 1 could be used if needed in a specific application to connect to lights or other loads desirably disconnected below a given battery voltage. Otherwise the components in block C and the connection to C1 would be omitted.

SCR5 may be considered as operating in a full wave rectification circuit as opposed to half wave, since because of diode D4 and D5 it may conduct for either half of the alternator cycle. At the frequencies involved in systems of this type where permanent magnet alternators are driven by high speed engines, SCR's are often unreliable in full wave circuitry because the SCR cannot turn off during the very small time that the current is zero at the point where the alternator voltage goes through zero. This problem is overcome in the gate drive circuit of SCR3 and SCR4 comprising SCR5 and diodes D4, and D5 in the following way. Assuming the top end of winding A1 is positive and therefore SCR3 is capable of conducting. With a gate signal supply to SCR5, current may flow through diode D4 and SCR5 to the gate of SCR3 turning on SCR3. The voltage across SCR3 then will drop to the on voltage of that device and remain there for the remainder of the half cycle. During this conduction, the gate of SCR3 will typically be positive compared to it's cathode by between 0.5 and 1 volt. For current to continue to flow through SCR5, the voltage drop from the anode to the cathode of SCR3 would have to equal this 0.5 to 1 volt, plus the anode to cathode drop of SCR5 at its holding current plus the forward voltage drop in diode D4 at the holding current of SCR5. With most commercial components this is not true. Therefore SCR5 will begin to turn off as soon as SCR3 turns on. Therefore the entire period of time when SCR3 is conducting is available for the turn off of SCR5. Described in any other way and assuming negligible voltage across the resistance associated with the various semiconductor junctions, the voltage from the anode to the cathode of SCR3 when conducting is the equivalent voltage of one forward biased diode. If current were to continue to flow through SCR5 to keep it on, the sum of the voltage drops of SCR5 and D4 and gate to cathode junction of SCR3 would also have to equal the voltage of one junction. Since the three are greater than the one in the parallel path, SCR5 clearly will turn off. If components in the SCR3 location have unusually high forward voltage drops an additional diode may be connected in series with diode D4 and another one in series with diode D5 to further assure the turn off of SCR5. The same explanation would apply to SCR5 in FIG. 1 and both SCR5 and SCR8 in FIG. 3.

It should also be noted that in FIG. 1 and FIG. 2 the maximum current in SCR3 and SCR4 is approximately half the maximum current in SCR1 and SCR2. This is desirable and an object of this invention. Most commercially available SCR's have the anode connection connected to the heat sink or case. Thus SCR1 and SCR2 carry the highest current and therefore produces the highest power dissipation and will be connected directly to ground which is the most practical heat sink, without the necessity of electrical isolation adding additional and undesirable thermal impedance. Diode D1 must, however, be isolated but it will be realized by one skilled in the art that the temperature capabilities of power rectifiers such as diode D1 are considerably higher than those typically available of silicon control rectifiers.

FIG. 3 shows another version of this invention, and is advantageous when the heat dissipation capability of alternator windings A1 and A2 is marginal, or when the output currents that the alternator is capable of producing are higher than the current capabilities of economically available SCR's. As and example: an industry standard T0220 case SCR is readily available from a number of manufactures with a 25 amp rating, however 50 amp rated SCR's are more than twice as expensive because they must be in a larger case and these larger cases are produced in very small quantities compared to the industries standard T0220. The circuit of FIG. 3 produces no more resistive loss or heating in alternator windings A1 or A2 under any speed condition than would be produced by either the series or parallel connection of these windings to a conventional bridge rectifier or regulator.

The components in FIG. 3 block F combine with those in FIG. 3 block A to produce the functions described in FIG. 1 and FIG. 2 as being in block A. Other blocks of the circuit of FIG. 3 preform similar functions to those in similarly designated blocks in FIG. 1 and FIG. 2.

FIG. 3 will first be described as it would operate with no gate signal available to SCR6 and SCR7, and thus these components are effectively in an open circuit condition. This would be the actual operation above the previous defined cross over frequency. Winding A1 is effectively connected to the bridge rectification circuit consisting of SCR1 and SCR2 and diodes D11 and D12 to supply power to the output labeled with a positive sign. Likewise, alternator winding A2 supplies, in parallel, power to the same output through rectification components SCR3 and SCR4 and diodes D13 and D14. SCR5 controls gate drive to SCR1, SCR2, SCR3, and SCR4 with diodes D1, D2, D3 and D4 effectively interrupting undesired current paths between these gates. Only SCR1 or SCR2 may have the cathode negative compared to the anode at any given instant. Therefore only that SCR is turned on and diode D1 or D2 supplies gate current to the SCR with a more negative gate, therefore steering the available gate drive current to the SCR of this pair being capable of being turned on. The same is true of SCR3 and SCR4 and diode D3 and D4. At a given instant, assume SCR1 and SCR3 are capable of being turned on. SCR5 does not have to supply enough current to turn on both simultaneously since the first one that turns on will thus turn on to produce a more positive voltage on its gate diverting the available gate current to the SCR still needing to be turned on. Thus the internal resistances in the gate regions of SCR1, SCR2, SCR3, and SCR4 are very non-critical. With this drive circuit SCR5, which would be of the gate sensitive variety, would normally be biased so that it could be turned on by current through the current limiting resistor R3 supplying current from the output labeled with a "plus" sign. Thus SCR5 would turn on whenever there was sufficient voltage to overcome the forward voltage drop inherent from its anode to cathode in the on condition plus the drop in one of the steering diodes D1 through D4 plus the drop one of the SCR gate to cathode junctions typical of SCR1 through SCR4. Thus the SCR's are capable of firing very near the crossover voltage of the alternator. This is desirable to maximize output of the system and minimize radio interference sometimes described as electromagnet interference, which might otherwise be radiated from the leads of the system or the alternator. SCR5 and therefore SCR1 through SCR4 may be turned off by turning on transistor Q1 and thus shunting the current supplied through R3 around the gate to cathode junction of SCR5. Transistor Q1 may be turned on by current flow through resistor R1 with resistor R2 allowing a path to prevent turn on from small leakage currents that may be present. The current through resistor R1 is controlled by transistor Q3 which is controlled by the voltage across R7. Thus when the output voltage exceeds the voltage of zener diode Z2 by a sufficient voltage to produce a voltage across the R7 portion of the voltage divided R7 and R8, to turn on transistor Q3, collector current from transistor Q3 can turn on transistor Q1, turning off SCR5 and in turn SCR1, SCR2, SCR3, and SCR4 to prevent further undesirable increase in the output voltage. "Turned off" as used above in reference to SCR's means rendered non-conducting during the next half cycle. Below the cross over RPM or frequency as previously defined, the output of this system decreases rapidly with RPM except for the presence of SCR6 and SCR7. Thus it is desirable to turn on SCR6 and SCR7 below the cross over frequency to effectively connect alternator windings A1 and A2 in series. When this is done, diode D12 and D13 and SCR2 and SCR3 are reverse-biased as described concerning diode D1 in FIG. 1 and FIG. 2. The magnitude of this reverse voltage is approximately 50% of the output voltage of this system, therefore these components are effectively open circuit and produce no significant dissipation or other undesirable effects.

At the instant when the top end of windings A1 and A2, shown by the polarity dots, are positive compared to the bottom end, current may therefore flow from ground through SCR4 through winding A2 through SCR7 through winding A1 and through diode D11 to the output. During the other half cycle when the bottom end of the windings are positive current may flow from ground through SCR1 winding A1, SCR6 winding A2 and diode D14 to the output. Thus a full wave bridge is effectively connected across the two windings in series. SCR6 and SCR7 are turned on by SCR8 which controls the gate current through diodes D5, D6, D7 and D8. Diodes D5 and D6 direct current from the top of winding A2 or the bottom of winding A1, whichever is more positive at a given instant, through SCR8 anode to cathode and through diode D7 or D8 to the gate of SCR6 or SCR7 whichever has it's cathode more negative at that instant and therefore is capable of being turned on because it's anode is positive compared to it's cathode.

Gate drive is supplied to SCR8 from the positive output through transistor Q2 and current limiting resistor R7. Resistors R4, and capacitors C2 are connected from the gate to cathode of SCR8 to prevent small leakage currents or high frequency noise from turning on SCR8 when this is not desired. The base or control element of transistor Q2 is supplied with two opposing currents. The component values are selected so that these two currents cancel each other at the cross over frequency.

Resistor R6 is a current limiting resistor to supply a negative current, that is a current that would tend to turn on transistor Q2. The value of this current is controlled by the resistance of resistor R6 and magnitude of the output voltage. Resistor R5 is connected to the lower end of winding A2. When the output voltage is below the desired regulation voltage, a square wave is present at this connection point. The magnitude of this square wave is the output voltage of the system plus the forward voltage drop of the rectification components D14, and SCR4.

However, as previously described for equivalent components in FIG. 1 the positive portion of this waveform is limited by the forward conduction of zener diode Z1. Thus the available square wave is the output voltage plus the forward voltage drops of Z1 and SCR4. The current that this voltage change at the frequency of the alternator can produce through capacitor C3 as rectified by diodes D9 and D10. This current is of the polarity to turn off transistor Q2. The positive and negative currents just described are averaged by capacitor C4. Thus transistor Q2 is on below a selected frequency, normally chosen as the crossover frequency previously described, and off above that frequency.

When transistor Q2 is on SCR8 is gated on whenever forward-biased thus gating on SCR6 and SCR7. As previously described, SCR8 would then turn off immediately upon the beginning of conduction of SCR6 or SCR7 and would be ready to turn on during the next half cycle to turn on the other SCR. Thus below a selected frequency alternator windings A1 and A2 are connected to the output through a bridge circuit consisting of SCR1, and SCR4 and diode D11 and D14 with SCR6 and SCR7 forming the connection between windings A1 and A2 to complete the circuit. Under these conditions SCR2 and SCR3 and diodes D12 and D13 are not biased on or forward and therefore do not conduct. Above the selected or crossover frequency, SCR6 and SCR7 are off; therefore winding A1 is effectively connected to a bridge circuit consisting of SCR1 and SCR2 and diode D11 and D12. Winding A2 is effectively connected to a second bridge circuit consisting of SCR3, and SCR4 and diodes D13, and D14. The components from FIG. 1 in block C may be inserted in the blank block C of FIG. 3 if desired.

Typical large outboard motors in use at the present have alternator outputs in the range of 35 amperes. This current is essentially flat over the RPM range used for cruising of the boats normally powered with these motors. Even with the twin motor installations common on larger fishing or cruising boats the available maximum output of 70 amperes is not sufficient to realistically run air conditioning or electric hot water heaters. The circuitry shown in FIG. 3 effectively doubles this output for twin motors to 140 amperes which would be sufficient, without discharging batteries at cruising speeds normally used, to run either the electric water heaters normally installed in these boats and generally used only from dock power, or small air conditioners sometimes installed and again generally used only from dock power. With component values that one skilled in the art would reasonably choose for resistors R6 and R7, which would normally be in the hundreds to thousands of ohms and the currents through R7 and R8 being limited also by the voltage drop in zener diode Z2, and resistors R1 and R3 again being obviously in the hundred of thousands ohms range, it can seen that the current draw or this regulator with the engine stopped would typically be very low and negligible compared to the self discharge of storage batteries.

This circuit, and also the circuits of FIG. 1 and FIG. 2 effectively sense output or battery voltage during the portion of the alternator when the output is at or near zero. Thus the resistance of the leads to the battery, and the battery internal resistance do not reduce the effective regulation voltage.

When an SCR is conducting current from its anode to its cathode, a voltage appears on its gate. The voltage on the gate is positive with respect to the cathode. Thus, when for instance SCR 3 in FIG. 2 is conducting, current might flow from the gate of SCR 3 through the gate cathode junction of SCR 4. Under some condition such as high alternator frequency and high SCR current and temperature, SCR 4 might turn on at the beginning of the following half cycle even though SCR 5 was not on. This undesirable current path is interrupted in FIG. 5 by diodes d101 and d102. Diodes d101 and d102 also add to the voltage that would be required to keep SCR 5 on after either SCR 3 or SCR 4 turns on. This would allow circuit operation with higher anode-cathode voltages across SCR 3 or 4 when conducting. In FIG. 5, the effective forward drop of the three junctions, d4, SCR5 and d102 are connected from anode to gate of SCR 3.

While the invention has been described in what is presently considered to be a preferred embodiment, many modifications will become apparent to those skilled in the art. It is intended, therefore, by the appended claims to cover all such modifications as fall within the true spirit and scope of the invention.

What is claimed is:

1. An electronic switching system for rectifying and regulating an output of an engine driven alternator, said alternator supplying electrical power to a load for operating said load and to a battery for charging said battery, said electronic switching system comprising:

a battery having first and second terminals;

a load having first and second terminals, said load operable with said battery;

an alternator having first and second windings connected for forming a center tap therebetween and corresponding first and second winding end points;

a diode connected from said center tap to each of said first terminals of said load and said battery, each of said second terminals of said load and said battery connected to a common point;

a first control network connected to said battery for controlling a charging of said battery;

a second control network connected to said load for controlling power delivered to said load from said battery;

at least two first electronic switches, each of said at least two first electronic switches with load current carrying terminals and a control terminal, said load current terminals of at least two first electronic switches connected between said common point and respectively to said first and second end points of said alternator windings, said control terminals of at least two first electronic switches connected to said first control network; and at least two second electronic switches, each of said at least two second electronic switches with load current carrying terminals and a control terminal, said load current terminals of at least two second electronic switches connected between said common point and respectively to said first and second end points of said alternator windings, said control terminals of at least two second electronic switches connected to said second control network.

2. The electronic switching system of claim 1, wherein said load comprises a light.

3. The electronic switching system of claim 1, wherein said first control network comprises frequency sensing means responsive to a frequency delivered by said alternator.

4. The electronic switching system of claim 1, wherein said second control network comprises voltage sensing means responsive to a voltage across said load.

5. An electronic switching system for rectifying and regulating an output of an engine driven alternator supplying electrical power to a load for operating said load and to a battery for charging said battery, said electronic switching system comprising:

an alternator having at least two windings connected to form a center tap and two end points;

a diode having a first terminal connected from said center tap and a second terminal for connection to first terminals of a battery and a load, the battery and load each having a second terminal connected to a common point;

at least two first electronic switches each with load current terminals and a control terminal, said current terminals of said at least two first electronic switches connected between said common point and said end points of said alternator windings, said control terminals of said at least two first electronic switches adapted for connection to a first control network for controlling a charging of the battery; and at least two second electronic switches each with load current terminals and a control terminal, said current terminals of said at least two second electronic switches connected between said common point and said end points of said alternator windings, said control terminals of said at least two second electronic switches adapted for connection to a second control network for controlling power delivered to the load.

6. The electronic switching system of claim 5, further comprising:

a first control network connected to the battery for controlling a charging of the battery; and a second control network connected to the load for controlling power delivered to the load.

7. The electronic switching system of claim 6, wherein said first control network comprises frequency sensing means for sensing a operating frequency of said alternator.

8. The electronic switching system of claim 6, wherein said second control network comprises voltage sensing means for sensing a voltage across the load.

9. The electronic switching network of claim 6, wherein said alternator comprises a permanent magnet type alternator.

10. An electronic switching system for rectifying and regulating an electrical output of an alternator supplying electrical power to first and second loads, said electronic switching system comprising:

an alternator having at least two windings;

alternator windings connecting means for connecting said windings in series below a selected frequency of an electrical output of said alternator, said alternator windings connecting means connecting said windings in parallel above said selected frequency;

a first load containing a battery;

a second load; and load connecting means for connecting said first load to said second load when a voltage across said first load is at least at a selected voltage and for connecting said second load to said alternator for receiving power from said alternator when said voltage across said first load is less than said selected voltage.

11. The electronic switching system of claim 10, wherein said alternator comprises a permanent magnet type alternator and wherein said alternator is driven by an engine, the engine useful in propelling a vehicle, the engine operating at varying speeds corresponding to propulsion needs of the vehicle.

12. An electronic switching system for rectifying and regulating a flow of electrical power from an alternator to a load, said electronic switching system comprising:

an alternator containing at least two windings, each of said at least two windings for connecting to a load;

a full wave bridge rectification circuit connected across said at least two windings, said full wave bridge rectification circuit containing two first electronic switches responsive to a voltage across the load; and two second electronic switches connected across said at least two windings of said alternator, said two second electronic switches connected in parallel for rectification and control of said at least two windings, said two second electronic switches connected to said at least two windings to effect output thereof when said alternator operates above and below a selected frequency.

13. The electronic switching system of claim 12, wherein said full wave bridge comprises two diodes and two silicon controlled rectifiers connected in parallel with an anode of each connected to a cathode of the other.

14. An electronic switching system for charging a battery from a permanent alternator, said electronic switching system comprising:

a battery having a positive and a negative terminal;

an alternator containing a winding having ends and a center tap;

a diode having an anode connected to said center tap, said diode having a cathode connected to said positive terminal of said battery;

two first solid state switches responsive to a first control signal, each of said two first solid state switches connected to said winding of said alternator for allowing a flow of current from ground to said ends of said winding in response to said first control signal;

two second solid state switches having said ends of said winding connected thereto for allowing a flow of current from ground to said positive terminal of said battery in response to a second control signal; and a signal control network producing said first and second control signals, said first control signal responsive to a voltage of said battery, and said second control signal provided when said alternator is operating below a selected frequency.

* * * * *